(12) United States Patent
Wüthrich (10) Patent No.: US 8,596,188 B2
(45) Date of Patent: Dec. 3, 2013

(54) BREWING DEVICE FOR A COFFEE MACHINE

(75) Inventor: Christoph Wüthrich, Wiggiswil (CH)

(73) Assignee: Schaerer AG, Zuchwil (CH)

(*) Notice: Subject to any disclaimer, the term of this patent is extended or adjusted under 35 U.S.C. 154(b) by 97 days.

(21) Appl. No.: 12/674,187

(22) PCT Filed: Aug. 18, 2008

(86) PCT No.: PCT/EP2008/060803
§ 371 (c)(1), (2), (4) Date: Sep. 17, 2010

(87) PCT Pub. No.: WO2009/027259
PCT Pub. Date: Mar. 5, 2009

(65) Prior Publication Data
US 2011/0146498 A1 Jun. 23, 2011

(30) Foreign Application Priority Data
Aug. 28, 2007 (EP) .................................. 07115112

(51) Int. Cl.
*A47J 31/06* (2006.01)
(52) U.S. Cl.
USPC .......................... 99/295; 99/289 R; 99/302 P
(58) Field of Classification Search
USPC .......... 99/289 R, 289 T, 289 D, 289 P, 302 C, 99/302 P, 302 R; 241/46.013
See application file for complete search history.

(56) References Cited

U.S. PATENT DOCUMENTS

| 1,174,656 | A | * | 3/1916 | Beckwith | 241/41 |
| 4,987,988 | A | * | 1/1991 | Messina et al. | 193/2 R |
| 5,307,734 | A | * | 5/1994 | Lussi et al. | 99/287 |
| 5,316,781 | A | * | 5/1994 | Lussi et al. | 426/433 |
| 5,333,537 | A | * | 8/1994 | Lussi et al. | 99/287 |
| 5,367,947 | A | * | 11/1994 | Lussi et al. | 99/287 |
| 2004/0086610 | A1 | * | 5/2004 | Allan Falk et al. | 426/243 |
| 2005/0139080 | A1 | * | 6/2005 | De'Longhi | 99/275 |

FOREIGN PATENT DOCUMENTS

| FR | 2395730 A | 1/1979 |
| GB | 2165140 A | 4/1986 |

OTHER PUBLICATIONS

International Search Report dated Jul. 20, 2009.

\* cited by examiner

*Primary Examiner* — Henry Yuen
*Assistant Examiner* — John Wasaff
(74) *Attorney, Agent, or Firm* — Pearne & Gordon LLP (57) ABSTRACT

A brewing device (1) for a coffee machine includes a brewing cylinder (6) with a cylindrical bore and two pistons (3 and 4), such that the brewing cylinder is able to be closed to form a brewing chamber. The brewing cylinder (6) and pistons (3 and 4) are held in a frame (2). Before the brewing operation, coffee powder is introduced into the brewing chamber. The coffee powder cake (17) ejected from the brewing chamber is stripped off into a collection container (20) via a stripping element (18). Disposed between the stripping element (18) and the collection container (20) is a subcomponent (22) that separates the coffee powder cake (17), stripped off by the stripping element (18), into pieces (17', 17") before the coffee powder cake reaches the collection container (20). The coffee powder cakes are stored in the container (20).

18 Claims, 7 Drawing Sheets

BREWING DEVICE FOR A COFFEE MACHINE

This invention relates to a brewing device for a coffee machine, comprising a brewing cylinder with a cylindrical bore and two pistons, by means of which the brewing cylinder is able to be closed off to form a brewing chamber, the brewing cylinder and the pistons being held in a frame in a way displaceable relative to one another and being drivable via a drive device, a coffee powder supply device, with which the coffee powder is fillable into the brewing chamber before the brewing operation and before the closing off of said chamber, and a stripping device provided with a stripping element with which the coffee powder cake ejected from the brewing chamber by a piston after the brewing operation is able to be stripped off into a collection container.

Brewing devices of this kind are known in diverse designs, and are used both in household coffee makers and in restaurant coffee machines. To dispense a coffee, regardless of which type of coffee is being dispensed, such as, for instance, normal coffee, espresso coffee, ristretto coffee, etc., the necessary amount of coffee powder, usually freshly ground, is filled into the brewing chamber. The brewing chamber is subsequently closed, after which hot water is conducted at the desired pressure through the brewing chamber, coffee being brewed. The thus freshly brewed coffee reaches the provided vessel via an outlet. The brewing chamber is then opened. The coffee powder residue located therein is ejected from the brewing chamber, and ends up in a container.

Such a brewing device is known from EP-A 0 528 758, for example. After brewing of a coffee, the coffee powder cake, remaining in the brewing cylinder, is ejected from the brewing cylinder by the one piston, and is taken away by a stripper of a stripping device, so that this coffee powder cake ends up in a collection container. Owing to the compression of the coffee powder in the brewing chamber for brewing of the coffee and owing to resistance achievable thereby (so that a pressure of about 8 bar can be attained for the brewing water in the brewing cylinder), this coffee powder cake has a compact cake form, which ends up in the collection container. This collection container also serves as a collecting vessel for these coffee powder cakes, which come to lie next to and on top of one another by means of the stripper in a disorderly fashion. Through the compact shape of these coffee powder cakes, large voids thus occur between these cakes in this collecting container. The collecting container either has to be of large design or it is filled up relatively fast, such that it has to be emptied frequently, which is not desirable.

It is also desirable for a coffee machine to have an overall height that is not too big since a coffee machine placed on a counter of a restaurant, for instance, is not supposed to interfere with the personnel's view of the guests. The collection container for the coffee powder cake in the brewing device under consideration is essentially able to be disposed only beneath the coffee brewing assembly for the stripped coffee powder cake to be able to fall into this container. As already mentioned in the preceding, the holding capacity of this collection container should be as large as possible so that the container does not have to be emptied too often; in order to be able to keep the overall height of the coffee machine at a desirable dimension, this collection container cannot be designed too high, however. Thus, with respect to dimensions of the collection container and holding capacity, a compromise must be made that more or less satisfies the two demands.

The object of the present invention thus consists in manipulating the coffee powder cake in such a way that the voids occurring between these cakes when deposited in the collection container are able to be kept as minimal as possible, whereby, with smaller volume of the collection container, more coffee powder cakes are able to be accepted.

According to the invention, this object is achieved in that a dividing element is disposed between stripping element and collection container, which dividing element separates into pieces the coffee powder cake, stripped off by the stripping element, before it ends up in the collection container.

Thus, before the coffee powder cake arrives in the collection container, this cake is broken up or cut up by the dividing element, and is separated into smaller pieces, whereby a substantially more minimal amount of void occurs between the individual pieces of this coffee powder cake in the collection container, and the holding capacity of the corresponding collection container is thereby greatly improved.

Preferably, the dividing element is aligned substantially perpendicular to the circular surface of the coffee powder cake when the latter passes through the dividing element, whereby an optimal reduction or crumbling of the coffee powder cake is achieved.

A further advantageous embodiment of the invention consists in the dividing element being disposed such that its spacing from the stripping element in its completely driven-out stripping position is smaller than the diameter of the coffee powder cake, whereby it is achieved that the stripping element presses the coffee powder cake at least partially through this dividing element, so that a breaking into pieces of this coffee powder cake in an optimal way is ensured.

Preferably, the dividing element is attached to a chute, which guides the stripped-off coffee powder cake into the collection container. A simple attachment of this dividing element, and thus a simple structural design, is thereby achieved.

The chute can be attached to the frame of the brewing device. The chute can however also be attached to the collection container itself. Depending upon the construction of the brewing device and of the collection container, one solution or the other could be advantageous.

Preferably, the dividing element is designed as a blade, whereby the coffee powder cake is cut up into different pieces.

Another advantageous embodiment of the invention consists in that the blade is disposed at an angle with respect to the stripping direction, in which the coffee powder cake is able to be stripped, it being thereby achieved that the coffee powder cake disintegrates into smaller pieces.

One embodiment of the brewing device according to the invention will be described more closely in the following, by way of example, with reference to the attached drawing.

Shown are.

As can be seen from FIGS. 1 to 5, the brewing device 1 comprises an upper piston 3 held in a fixed way in a frame 2. Provided axially opposite the upper piston 3 is a lower piston 4, which is axially displaceable with respect to the upper piston 3. This lower piston 4 is held in a cylindrical bore 5 of a brewing cylinder 6, which brewing cylinder 6 is likewise axially displaceable. The brewing cylinder 6 is provided with a threaded part 7, which is engaged with a threading 8 of a spindle 9 rotatably held in the frame 2. This spindle 9 is drivable via an electromotor 10, which is likewise attached to the frame 2.

Figure 1:
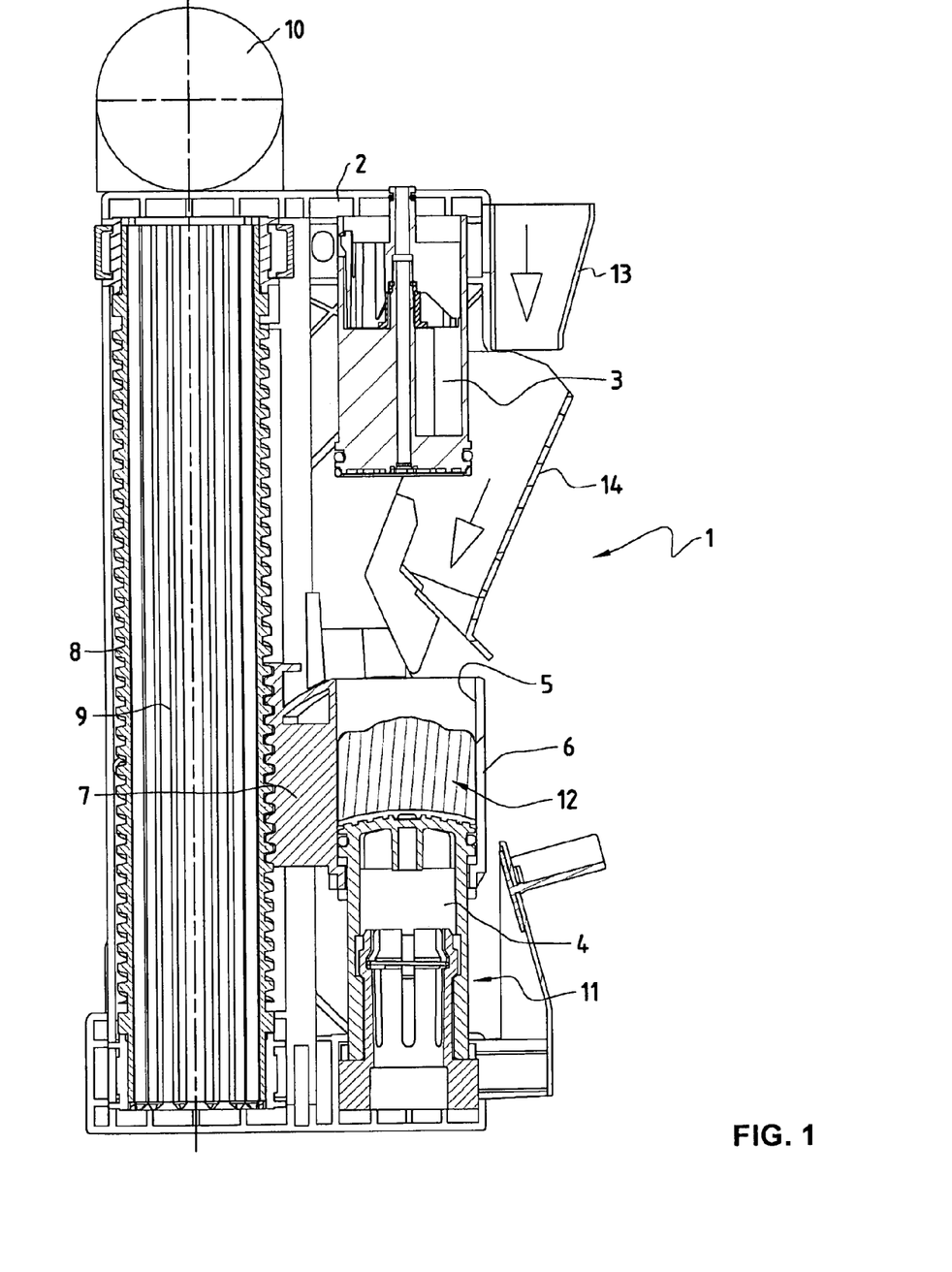
FIG. 1, a sectional representation of a brewing device of a coffee machine during the step of filling of the coffee powder into the brewing chamber.

Shown in FIG. 1 is the brewing device 1 in filling position. This means that the lower piston 4 is situated in the lowermost position, in which it is held by the catch device 11 installed on the frame. The lower piston 4 attained this position by the brewing cylinder 6 having been likewise brought into the lowermost position via the spindle 9, into which position the lower piston 4 was carried along until it engaged in the catch device 11. Afterwards the brewing cylinder 6 was raised again through corresponding rotation of the spindle 9, as can be seen in FIG. 1. The lower piston thereby remained in the lowermost position, and the brewing cylinder 6 thus lifted itself in relation to the lower piston 4, the brewing chamber 12 thus being formed inside the brewing cylinder 6.

The freshly ground coffee powder is now filled into this brewing chamber 12. This coffee powder is ground in a known way in a coffee mill, which is not shown. Via a first funnel 13, the powder reaches a pivotable funnel 14, through which the ground coffee powder is led into the brewing chamber 12. The amount of coffee powder introduced is hereby metered, depending upon which type of coffee is supposed to be dispensed.

Figure 2:
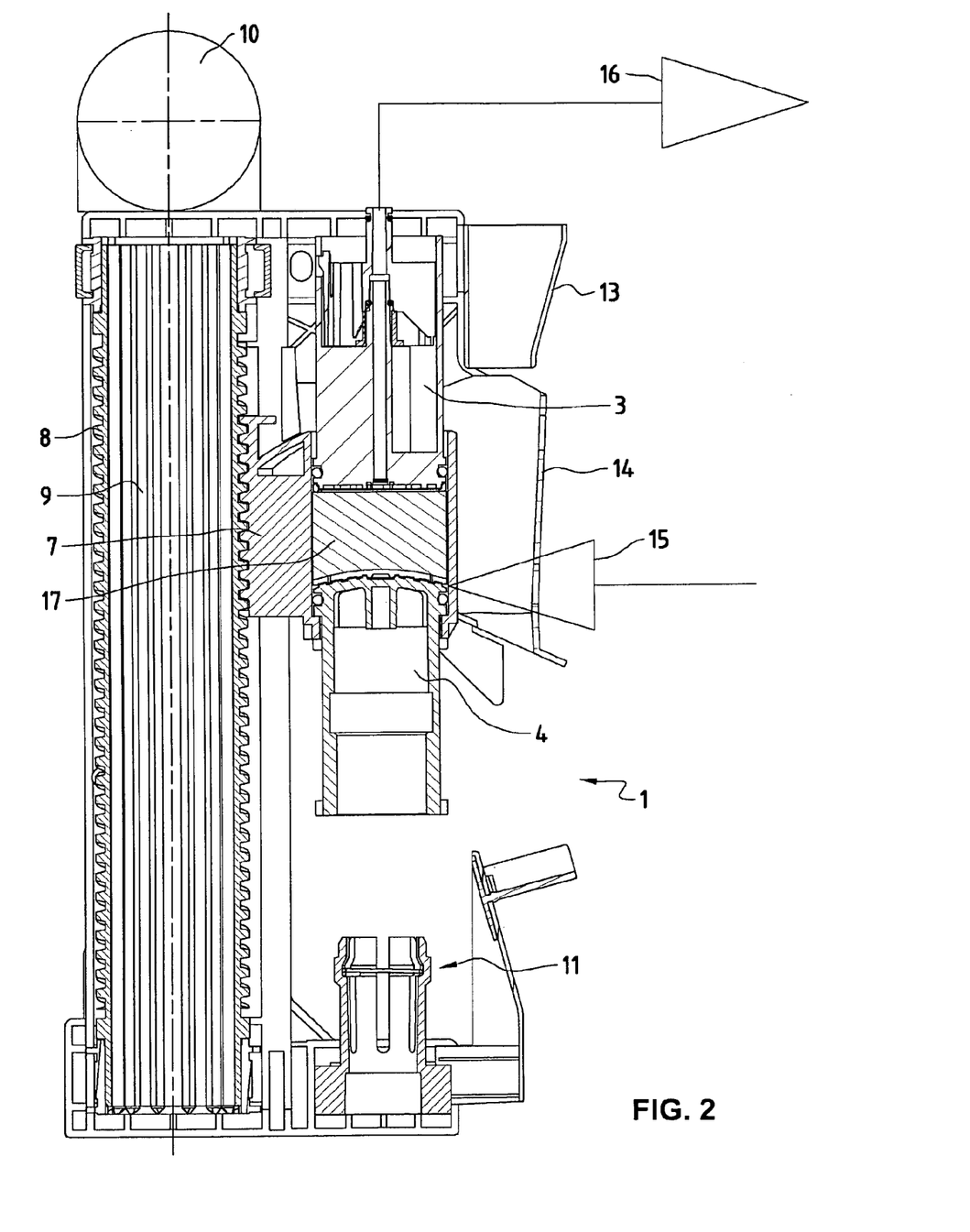
FIG. 2, a sectional representation of the brewing device with closed brewing chamber during the brewing operation for a coffee.

After the filling of the brewing chamber 12 with freshly ground coffee powder, the spindle 9 is set in rotation via the electromotor 10. Via the threaded part 7, the brewing cylinder 6 is driven upwards, the lower piston 4 being taken along via corresponding tappets. The brewing cylinder 6 and the lower piston 4 are driven upwards until the brewing chamber 12 is closed off by the upper piston 3, and the coffee powder located in the brewing chamber 12 is pressed. In this position, which is shown in FIG. 2, the brewing position is reached. In a known way, the hot water can now be introduced from below into the brewing chamber 12, as shown by arrow 15. The hot water flows through the brewing chamber 12 and the ground coffee powder located therein, and is discharged as brewed coffee via a discharge channel, provided in the upper piston 3 in a known way, as shown by arrow 16, and in a known way, via a line not shown, ends up in an outlet of the coffee machine and from there in the vessel provided. To brew the coffee, the coffee powder located in the brewing chamber 12 is compressed between the two pistons 3 and 4 in such a way that this powder offers resistance to the brewing water flowing through, so that the brewing water has to be pressed through the brewing chamber 12 at a pressure of about 8 bar. Thereby created in the brewing chamber 12 is a coffee powder cake which is very compact and moist.

As can be seen from FIG. 2, the pivotable funnel 14 is pivoted away during the upwards driving of the brewing cylinder 6 with the lower piston 4; this pivotable funnel 14 is provided here with a spring (not shown), which is able to press the pivotable funnel 14 back into the position shown in FIG. 1.

Figure 3:
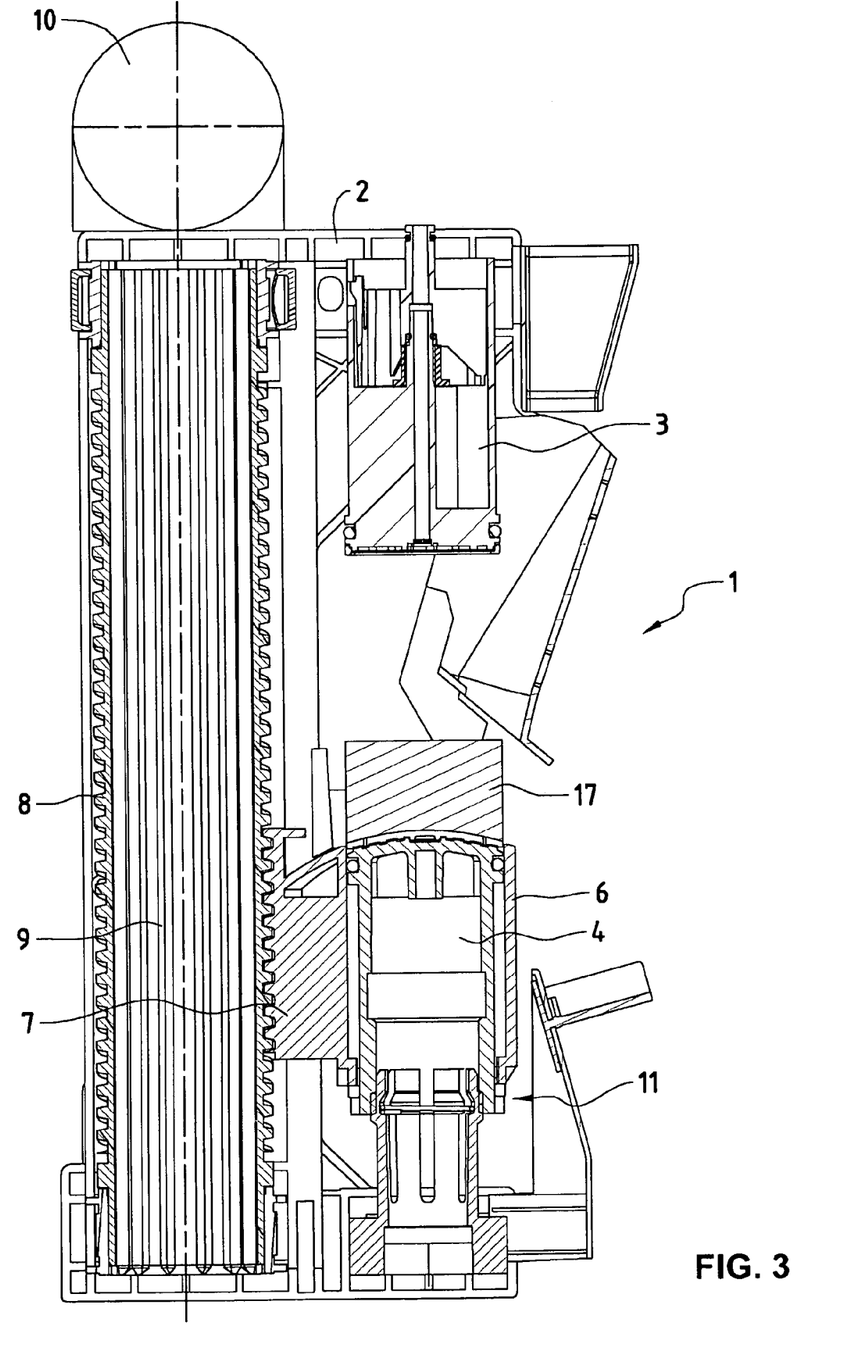
FIG. 3, a sectional representation of the brewing device with opened brewing chamber and of the coffee powder cake ejected by the lower piston.
Figure 4:
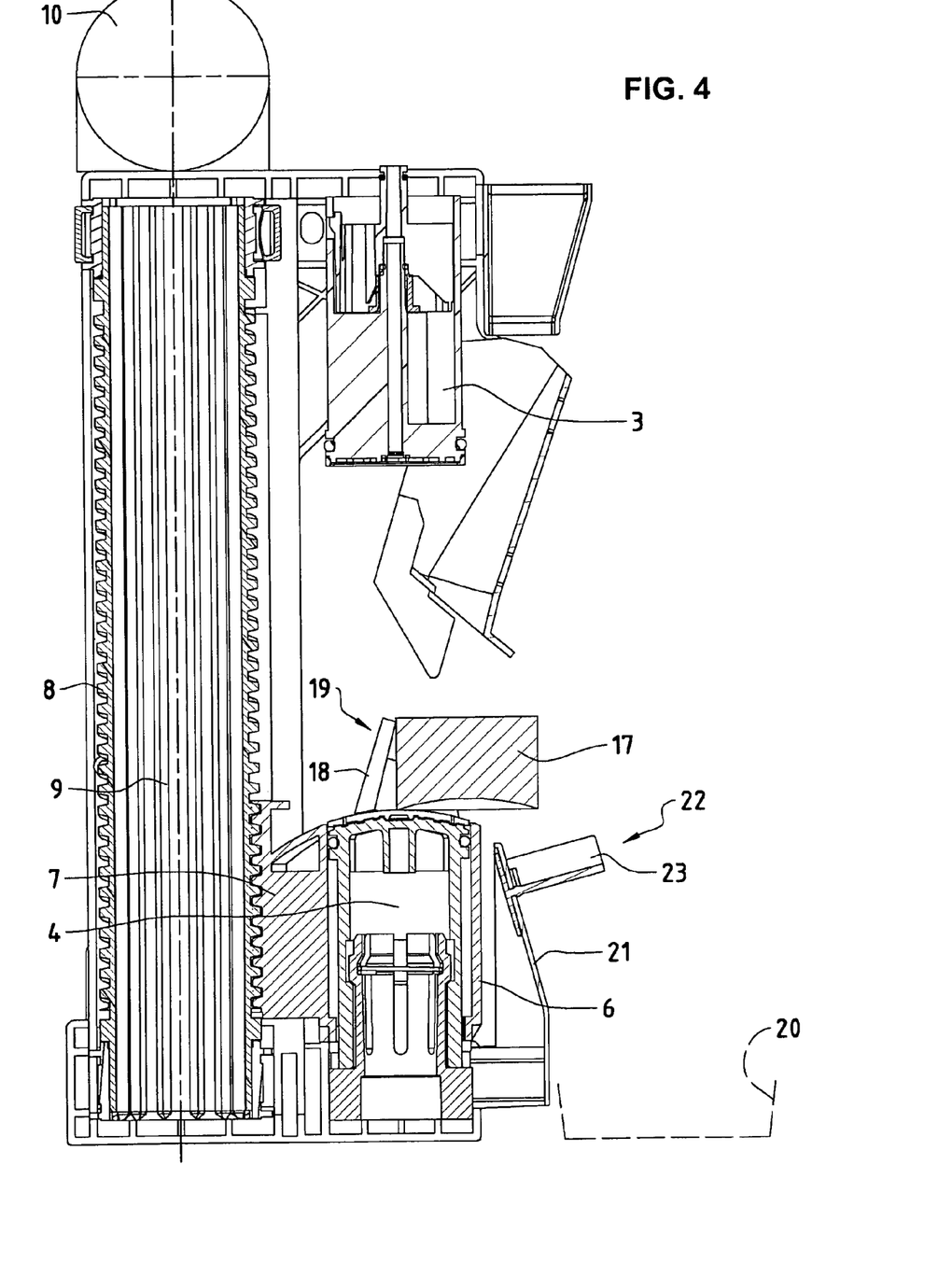
FIG. 4, a sectional representation of the brewing device with beginning of stripping of the coffee powder cake by the stripping device.

After the brewing operation is performed, the brewing chamber 12 is opened in that the brewing cylinder 6 and the lower piston 4 are driven downward by corresponding rotation of the spindle 9, as shown in FIG. 3. With its lower end, the lower piston 4 reaches here the catch device 11, and supports itself thereon. The brewing cylinder 6 is driven farther downward, and the lower piston 4 stands still, whereby the coffee powder cake 17 is ejected from the brewing cylinder 6, as can be seen in FIG. 3. When the brewing cylinder 6 has reached, with its upper edge, the upper edge of the lower piston 4, the lower piston 4 is carried along via corresponding stops, with the brewing cylinder 6 drivable farther downward, and the catch device 11 is driven in, as is shown in FIG. 4. When the brewing cylinder 6 and the lower piston 4 reach the area of the lower position, a stripping element 18 of a stripping device 19 is mechanically actuated in a known way. To this end, the stripping element 18 moves across the surface of the lower piston 4; the coffee powder cake 17 is stripped off of the lower piston 4 and the brewing cylinder 6, as can be seen from FIG. 4.

The coffee powder cake 17 should end up in a container 20, housed in the coffee machine 20, which container is only shown here schematically. Provided on the frame 2 for this purpose in the present embodiment example is a chute 21, via which the coffee powder cake 17 to be ejected ends up in the container 20. It is also conceivable to attach this chute 21 to the container 20. Installed on the chute 21 is a dividing element 22, which projects practically perpendicularly over the sliding surface of the chute 21. This dividing element 22 is designed as flat blade 23 in the present instance. Of course this dividing element 22 could also have a different shape, for example a rod or piece of wire. Of course a plurality of dividing elements installed next to one another could also be used. It is also conceivable that these dividing elements be installed in another place on the brewing device or on the container. Decisive is that this dividing element or these dividing elements extend transversely over the path which the coffee powder cake 17 traverses after the stripping off and before the reaching of the container.

Figure 5:
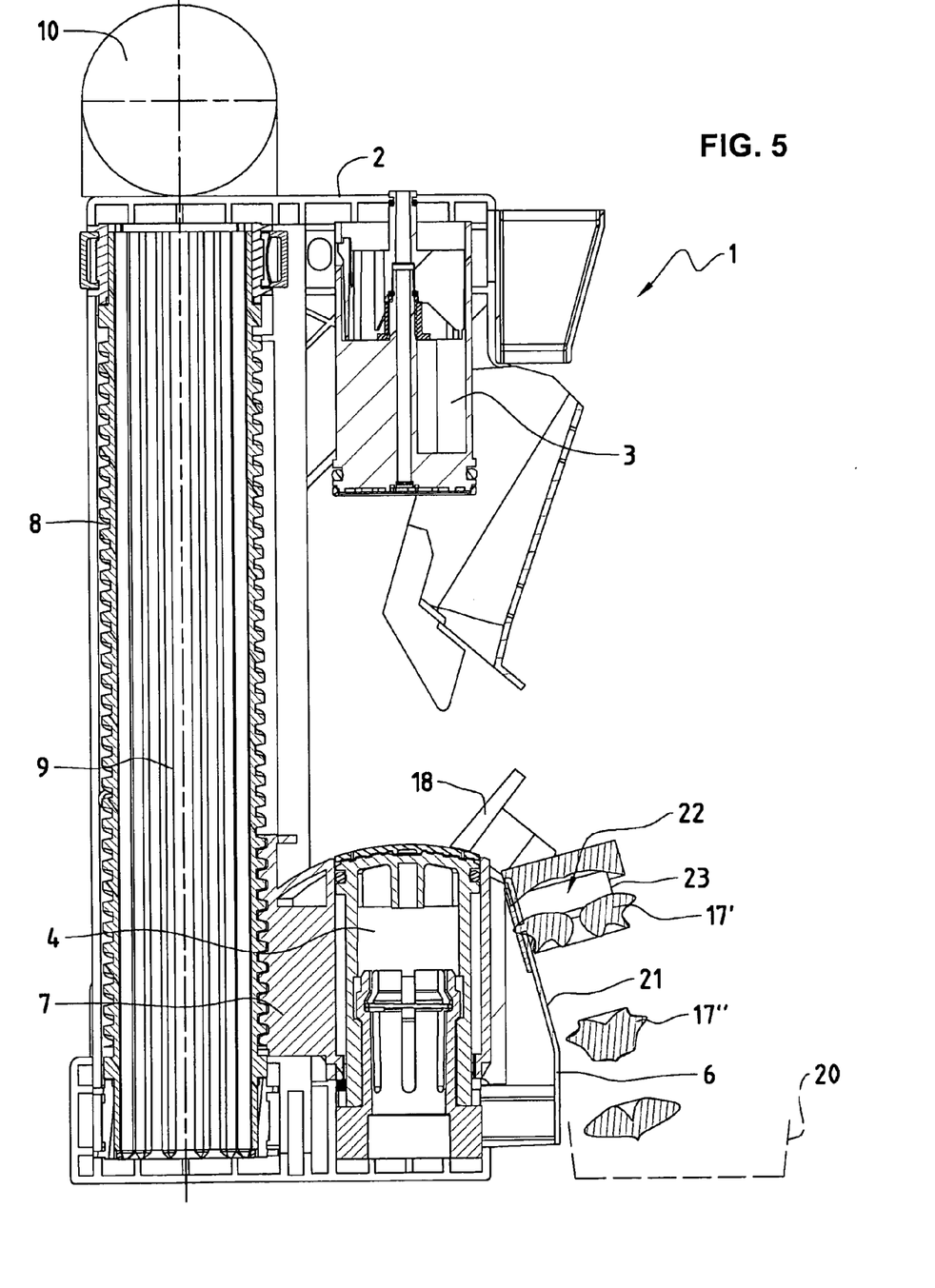
FIG. 5, a sectional representation of the brewing device, in which the stripper presses the coffee powder cake over the dividing element, whereby the coffee powder cake is separated into individual pieces.

As can be seen from FIG. 5, the coffee powder cake 17 is pressed by the stripping element 18 via the blade 23. The blade 23 causes the coffee powder cake 17 to be divided up into different smaller pieces 17', 17", which then fall into the container 20. These small pieces 17', 17", into which the original coffee powder cake 17 is divided up, fill up the space in the container 20 without bigger hollow spaces. The container 20 can thus accept more coffee powder cakes cut up into pieces than if these cakes were not cut up. The dimensions of the container can thereby be kept smaller without it having to be emptied frequently.

Figure 6:
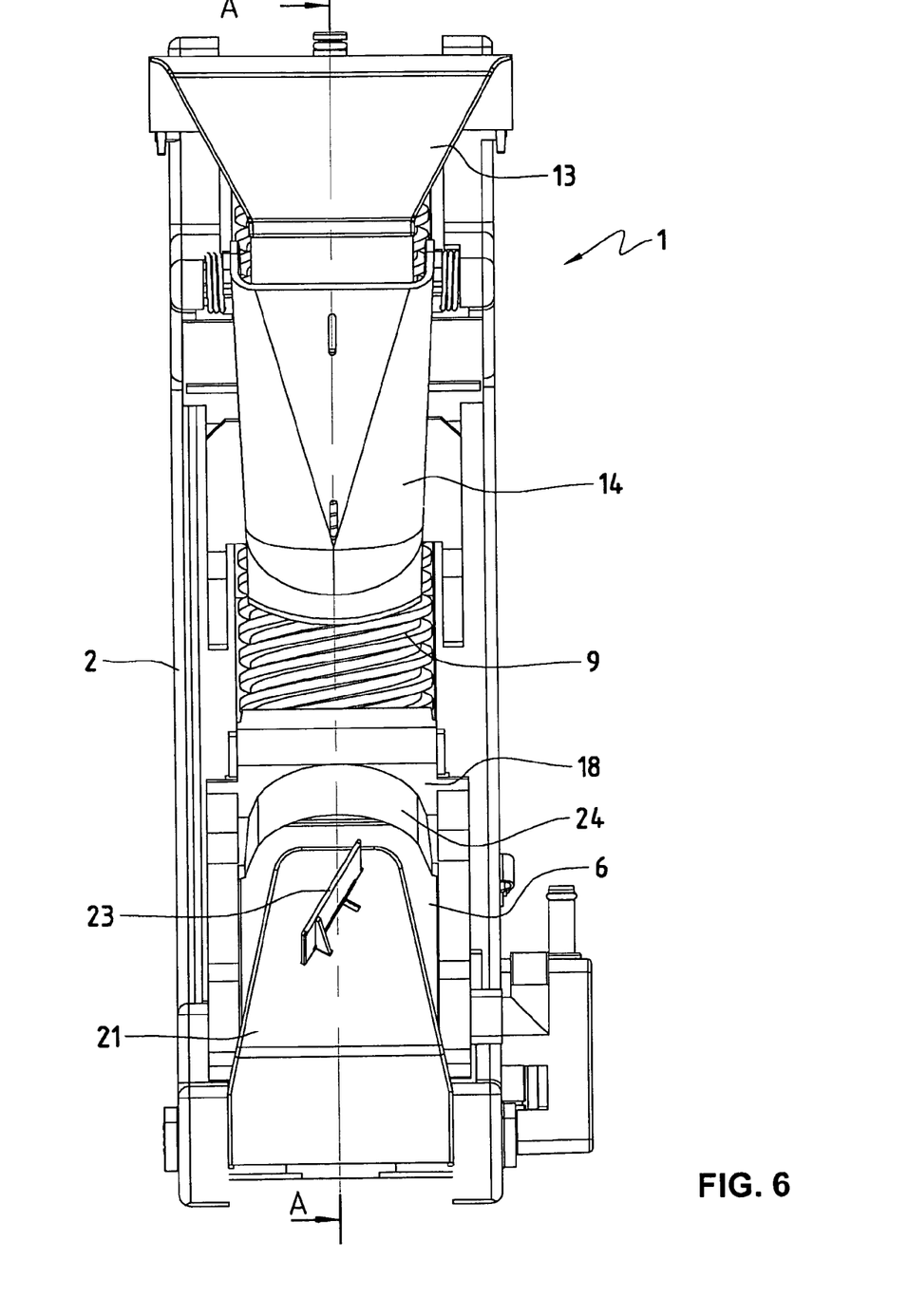
FIG. 6, a view of the brewing device according to FIGS. 1 to 5.
Figure 7:
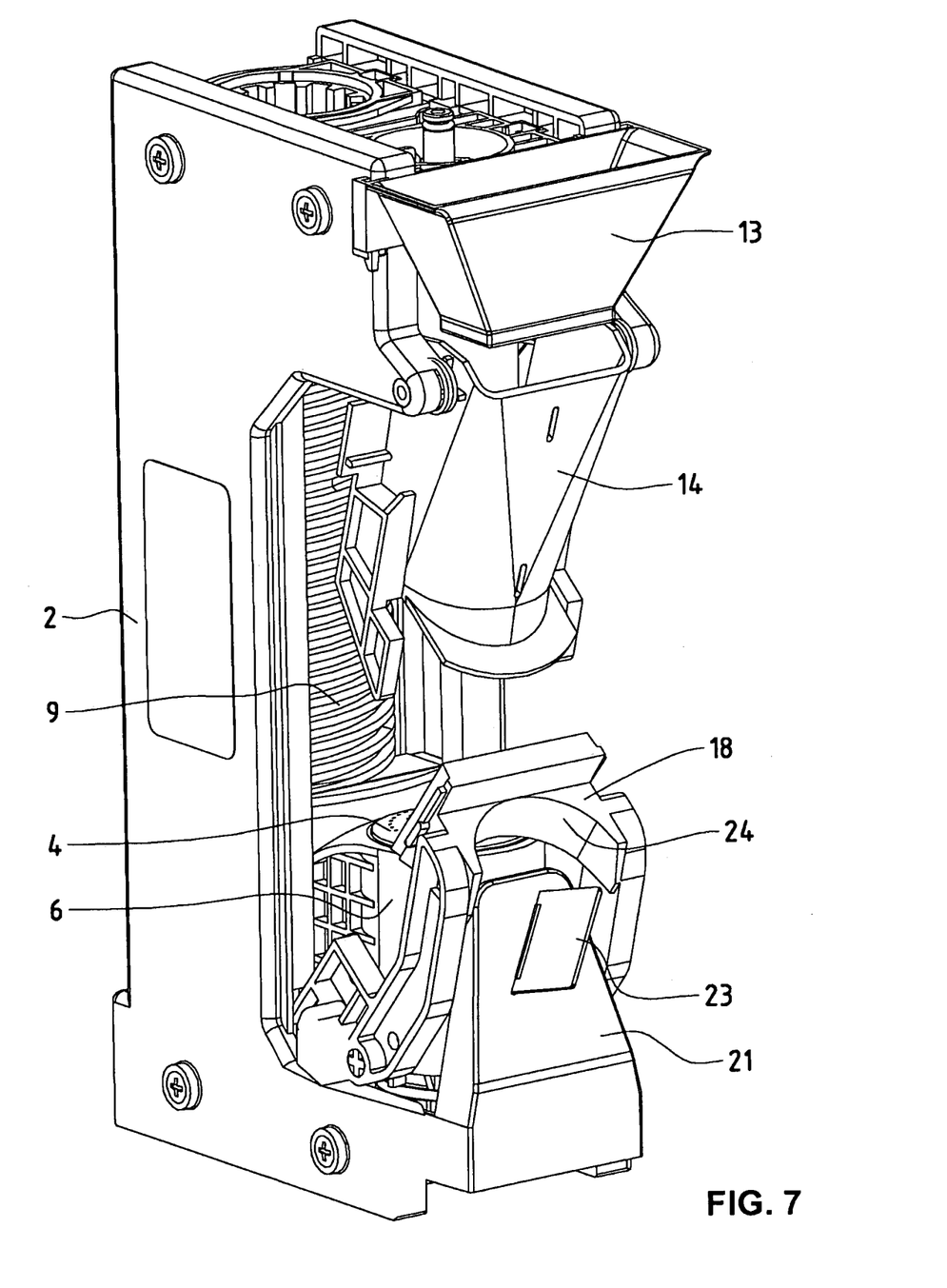
FIG. 7, a spatial view of the brewing device according to the preceding figures.

How the blade 23 is disposed on the chute 21 can be seen from FIG. 6 and FIG. 7. The blade here is disposed at an angle in relation to the stripping direction in which the coffee powder cake is strippable. Achieved through this position of the blade 23 inclined at an angle with respect to the stripping direction is that the coffee powder cake to be stripped off is divided up into more pieces than if this blade 23 were aligned in the stripping device. Additionally achieved by this position inclined at an angle is a partial crushing of the coffee powder cake.

It can also be seen from these two FIGS. 6 and 7 that the stripping element 18 has a curved stripping surface 24. With this curved stripping surface 24, the coffee powder cake is covered over half of its circumference, whereby an optimal stripping is able to be achieved.

Also visible from FIGS. 6 and 7 is that the spacing of the dividing element 22 or respectively of the blade 23 from the stripping element 18 in its completely driven-out stripping position is smaller than the diameter of the coffee powder cake 17. Thereby achieved is that the coffee powder cake is pressed over the dividing element 22 or respectively over the blade 23 during the stripping procedure when the stripping element moves toward its completely driven-out stripping position, whereby it is ensured that the coffee powder cake is divided up into individual pieces.

Achieved with this design is that the coffee powder cake, discharged from the brewing chamber, is broken up into small pieces, whereby fewer hollow spaces arise in the collection container than if the coffee powder cake were to end up in its whole form in this container. The holding capacity of the container is thereby improved. Even when the collection container is designed smaller, it is not necessary to empty it more often.

The invention claimed is:

1. A brewing device for a coffee machine, comprising a brewing cylinder with a cylindrical bore and two pistons, which close the brewing cylinder in a closed position to form a brewing chamber, the brewing cylinder and the pistons being displaceable relative one another and being drivable via a drive device, a coffee powder supply device, by means of which coffee powder is fillable into the brewing chamber before the brewing operation and before the closing off of said chamber, and a stripping device provided with a stripping element, with which a coffee powder cake, ejected from the brewing chamber by one of said two pistons, is able to be stripped off into a collection container, wherein a stationary dividing element is disposed between said stripping element and said collection container, which said stationary dividing element is positioned to separate into pieces said coffee powder cake, stripped off by said stripping element, before said coffee powder cake ends up in said collection container, wherein said container has an opening at the top and a bottom surface such that said coffee powder cake is moved by said stripping element into said stationary dividing element to form the separate pieces of said coffee powder cake which fall across said entire opening onto said bottom surface of said container, whereby accumulated said separate pieces of said coffee powder cake in said container are disposed of by emptying said container when it is full.

2. The brewing device according to claim 1, wherein the dividing element is aligned substantially perpendicular to the circular surface of the coffee powder cake when the coffee powder cake passes through the dividing element.

3. The brewing device according to claim 1, wherein said stripping element reaches an end position at the end of the stripping process, and the dividing element is disposed in such a way that its spacing from the stripping element in said end position is smaller than the diameter of said coffee powder cake.

4. The brewing device according to claim 1, wherein the dividing element is installed on a chute, which guides the stripped-off coffee powder cake into the collection container.

5. The brewing device according to claim 4, wherein the chute is attached to the frame of the brewing device.

6. The brewing device according to claim 4, wherein the chute is attached to the collection container.

7. The brewing device according to claim 1, wherein the dividing element is designed as a blade.

8. The brewing device according to claim 7, wherein the blade is disposed at an angle with respect to the stripping direction in which the coffee powder cake is strippable.

9. A coffee machine with a brewing device, comprising a brewing chamber, which is movable between a first, closed position and a second, open position, a stripping device, and a collection container, said stripping device being provided with a stripping element for stripping off a coffee powder cake from said brewing chamber into said collection container, when said brewing chamber is in said second, open position, wherein a stationary dividing element is disposed between said stripping element and said collection container, which said stationary dividing element separates into pieces the coffee powder cake, stripped off by the stripping element, before it ends up in said collection container, wherein said collection container has an opening at the top and a bottom surface such that said coffee powder cake is moved by said stripping element into said stationary dividing element to form the separate pieces of said coffee powder cake which fall across said entire opening onto said bottom surface of said collection container, whereby accumulated said separate pieces of said coffee powder cake in said collection container are disposed of by emptying said collection container when it is full.

10. The coffee machine according to claim 9, wherein the said coffee powder cake has a substantially cylindrical form with a circular surface, and said dividing element is aligned substantially perpendicular to the circular surface of the coffee powder cake when the coffee powder cake passes through the dividing element.

11. The coffee machine according to claim 9, or 10, wherein the dividing element is disposed in such a way that its spacing from the stripping element in its completely driven-out stripping position is smaller than the diameter of the coffee powder cakes.

12. The coffee machine according to claim 9, wherein the dividing element is installed on a chute, which guides the stripped-off coffee powder cake into the collection container.

13. The coffee machine according to claim 12, wherein the chute is attached to a frame of the coffee machine.

14. The coffee machine according to claim 12, wherein the chute is attached to the collection container.

15. The coffee machine according to claim 9, wherein the dividing element is designed as a blade.

16. The coffee machine according to claim 15, wherein the blade is disposed at an angle with respect to the stripping direction, in which the coffee powder cake is stripped.

17. A brewing device for a coffee machine, comprising a brewing cylinder with a cylindrical bore and two pistons, which close the brewing cylinder in a closed position to form a brewing chamber, the brewing cylinder and the pistons being displaceable relative one another and being drivable via a drive device, a coffee powder supply device, by means of which coffee powder is fillable into the brewing chamber before the brewing operation and before the closing off of said chamber, and a stripping device provided with a stripping element, with which a coffee powder cake, ejected from the brewing chamber by one of said two pistons, is able to be stripped off into a collection container, wherein a stationary dividing element is disposed between said stripping element and said collection container, which said stationary dividing element is positioned to separate into pieces said coffee powder cake, stripped off by said stripping element, before said coffee powder cake ends up in said collection container, wherein said stationary dividing element is a single blade, wire or rod.

18. A coffee machine with a brewing device, comprising a brewing chamber, which is movable between a first, closed position and a second, open position, a stripping device, and a collection container, said stripping device being provided with a stripping element for stripping off a coffee powder cake from said brewing chamber into said collection container, when said brewing chamber is in said second, open position, wherein a stationary dividing element is disposed between said stripping element and said collection container, which said stationary dividing element separates into pieces the coffee powder cake, stripped off by the stripping element, before it ends up in said collection container, wherein said stationary dividing element is single blade, wire or rod.

* * * * *

UNITED STATES PATENT AND TRADEMARK OFFICE
CERTIFICATE OF CORRECTION

PATENT NO. : 8,596,188 B2
APPLICATION NO. : 12/674187
DATED : December 3, 2013
INVENTOR(S) : Christoph Wüthrich It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 297 days.

Signed and Sealed this
Twenty-second Day of September, 2015

Michelle K. Lee
*Director of the United States Patent and Trademark Office*